United States Patent
Flaherty et al.

(10) Patent No.: US 11,861,627 B1
(45) Date of Patent: Jan. 2, 2024

(54) USING CUSTOMER INPUT TO DETERMINE PROPER FUNCTIONALITY OF A BLOCK STORAGE SERVICE

(71) Applicant: Amazon Technologies, Inc., Seattle, WA (US)

(72) Inventors: Mitchell Gannon Flaherty, Seattle, WA (US); Christopher Magee Greenwood, Seattle, WA (US); Sriram Venugopal, Issaquah, WA (US); Mark Robinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 15/967,263

(22) Filed: Apr. 30, 2018

(51) Int. Cl.
*G06Q 30/0201* (2023.01)
*G06F 9/50* (2006.01)

(52) U.S. Cl.
CPC ....... *G06Q 30/0201* (2013.01); *G06F 9/5027* (2013.01)

(58) Field of Classification Search
USPC ........................................................ 705/7.29
See application file for complete search history.

(56) References Cited

U.S. PATENT DOCUMENTS

| | | | | |
|---|---|---|---|---|
| 8,539,197 B1 * | 9/2013 | Marshall | ............... | G06F 3/0613 711/112 |
| 9,026,760 B1 * | 5/2015 | Marshak | ............... | G06F 3/0689 711/165 |
| 2012/0167094 A1 * | 6/2012 | Suit | ........................ | G06F 9/5077 718/100 |
| 2013/0311645 A1 * | 11/2013 | Nagami | .............. | G06F 11/0757 709/224 |
| 2015/0193263 A1 * | 7/2015 | Nayyar | .................. | G06Q 10/06 707/703 |
| 2016/0284196 A1 * | 9/2016 | Tilles | ..................... | G06Q 30/04 |

OTHER PUBLICATIONS

Khasnabish et al., Tier-Centric Resource Allocation in Multi-Tier Cloud Systems, IEEE Transactions on Cloud Computing, vol. 5, No. 3, Sep. 2017 (Year: 2017).*

* cited by examiner

*Primary Examiner* — Brian M Epstein
*Assistant Examiner* — Allison M Robinson
(74) *Attorney, Agent, or Firm* — Klarquist Sparkman, LLP (57) ABSTRACT

A block storage service analyzes customer behaviors as external signals to the health of the block storage service. In one example, using rules set by a customer for a health monitoring service, the block storage service can gain insights into what the customer cares about. The customer rules can then be used to setup internal monitors within the block storage service. If the internal monitors are triggered, the block storage service can proactively correct problems before the customer alarm thresholds are reached. For example, customer volumes can be moved to increase performance characteristics. In some cases, if the customer has too much performance capability, the customer volume can be moved to a less costly alternative.

19 Claims, 8 Drawing Sheets

USING CUSTOMER INPUT TO DETERMINE PROPER FUNCTIONALITY OF A BLOCK STORAGE SERVICE

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In some instances, storage resources may involve supplying one or more persistent memory storage "volumes" to a customer of the compute service provider. Cloud-based persistent memory storage volumes can allow a customer to safely record information into a memory of a volume, often resident in a server in the compute service environment with a guarantee that the customer's information will be protected by the service provider. One way this can be accomplished is by replicating the customer volume elsewhere in the compute service environment. In some instances, it may be desirable to monitor metrics of customer volumes by a service of the service provider, such as volume latency, input/output operations/second (IOPS), etc. Based on the results of such monitoring, corrective action can be taken.

DETAILED DESCRIPTION

A block storage service can rely on its own internal monitoring of volumes and servers to determine health of the volumes. Various metrics can be monitored including latency, connectivity, ability to drive Input/Output, replication, etc. Additionally, servers can be monitored for performance, capacity and drive health. However, these metrics do not take into account the customer's viewpoint on which metrics are important. The block storage service can supplement these metrics by analyzing customer behaviors as external signals to health (proper functionality from the customer's perspective) of the block storage service. In one example, using rules set by a customer for an external health monitoring service, the block storage service can gain insights into what the customer cares about. The customer rules can then be used to setup internal monitors within the block storage service. If the internal monitors are triggered, the block storage service can proactively correct problems before the customer alarm thresholds are reached. For example, customer volumes can be moved to increase performance characteristics. In some cases, if the customer has too much performance capability, the customer volume can be moved to a less costly alternative.

Figure 1:
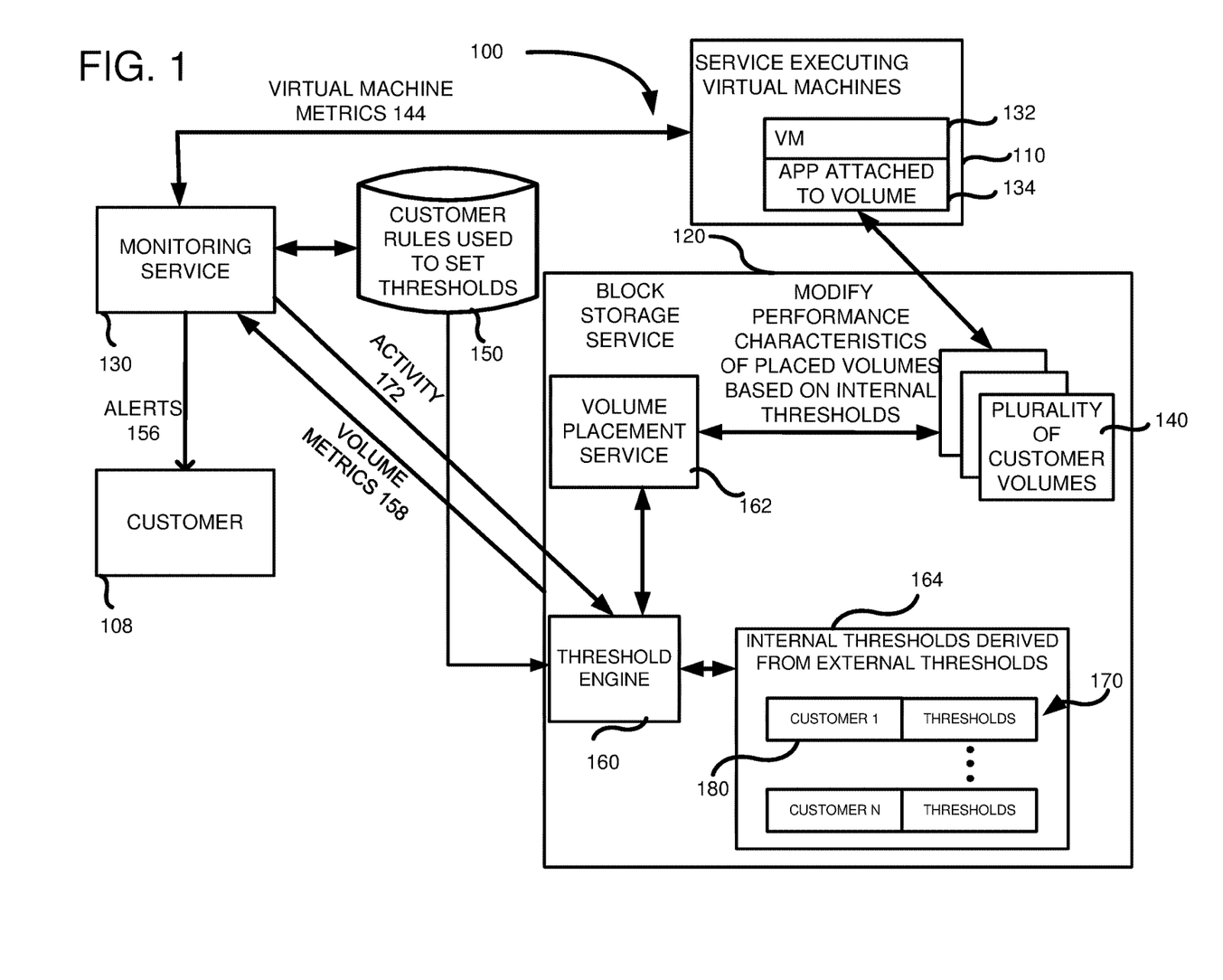
FIG. 1 is a system diagram of a block storage service that uses external indicators of customer intent to generate internal thresholds for monitoring volumes.

FIG. 1 is an example environment 100 of a compute service provider offering a variety of services to customers, such as customer 108. Example services include a service 110 for executing one or more virtual machines, a block storage service 120, which offers storage for customer volumes, and a monitoring service 130, which monitors customer virtual machines from service 110 and customer volumes from service 120. The service 110 is shown having a virtual machine 132 associated with customer 108 and an application 134 executing on the virtual machine. The application 134 can be attached to one or more volumes 140 in the block storage service 120. Metrics 144 from the virtual machine 132 can be passed to the monitoring service 100. The metrics can be a wide variety of different performance-related data associated with the virtual machine, such as CPU usage, memory usage, disk usage, network usage, etc. The customer 108 can establish rules 150 used to set thresholds that result in alerts 156 if the thresholds are exceeded by the metrics. In a simple example of an alert, if the CPU usage of the application 134 exceeds 80% of capacity, then the monitoring service 130 can detect that a threshold is exceeded and issue an alert 156 to the customer 108. In addition to the virtual machine metrics 144, the monitoring service 130 can receive volume-related metrics 158 from the block storage service 120. Example volume-related metrics can include TOPS, latency and throughput of the volumes 140.

The block storage service 120 can include a threshold engine 160, a volume placement service 162, and storage 164 for storing thresholds 170. The threshold engine 160 can receive the customer rules 150 and other activity 172 from the monitoring service 130. The activity 172 can relate to interactions with the customer, such as API calls from the customer asking about status of a volume, or the activity can relate to a number of alerts that have been triggered. Other types of activities can also be used. The threshold engine 160 can use the customer rules 160 to generate its own internal thresholds 170. As shown, each customer of the compute service provider can have their own thresholds. For example, the storage 164 can include entries in a table and a customer identifier 180 can be associated with customer 108. The identifier can be used as a key for searching the table and determining the thresholds 170 associated with the customer. Each customer can have their own unique thresholds. The internal thresholds 170 can be generated such that the thresholds are exceeded prior to the thresholds used by the monitoring service 130 so that the block storage service 120 can proactively correct problems prior to the customer 108 receiving alerts. In one example, the internal thresholds 170 can be a fixed percentage offset from the thresholds used by the monitoring service 130. By receiving the customer rules 150, the block storage service 120 can receive insights into what the customer 108 cares about. Such customer rules are external data to the block storage service, as opposed to data within the block storage service 120.

Although not shown in FIG. 1 (but further described below), the thresholds 170 can be monitored internally within the block storage service 170 and can be used to control the volume placement service 162 so as to modify performance characteristics of existing volumes 140 associated with the customer 108 or any new placements associated with the customer 108. Modifying the performance characteristics can entail selecting resources (e.g., server computers) with more processing power, network capacity, memory, etc. so that the volumes have increased IOPS, lower latency, increased throughput, etc.

The activity 172 can also be an external signal that something is problematic with the customer volumes 140. For example, if the customer 108 continuously requests about status of the volumes 140 at a frequency that exceeds a threshold amount, the block storage service 120 can use this external data signal to determine that the customer is concerned about the requested volumes. As such, the block storage service 120 can proactively move the volumes 140 so as to modify the performance characteristics. Other activities 172, such as alerts being triggered for multiple events close in time and across multiple customers can indicate a more systemic problem with the block storage service 120, allowing the block storage service to take corrective action.

Figure 2:
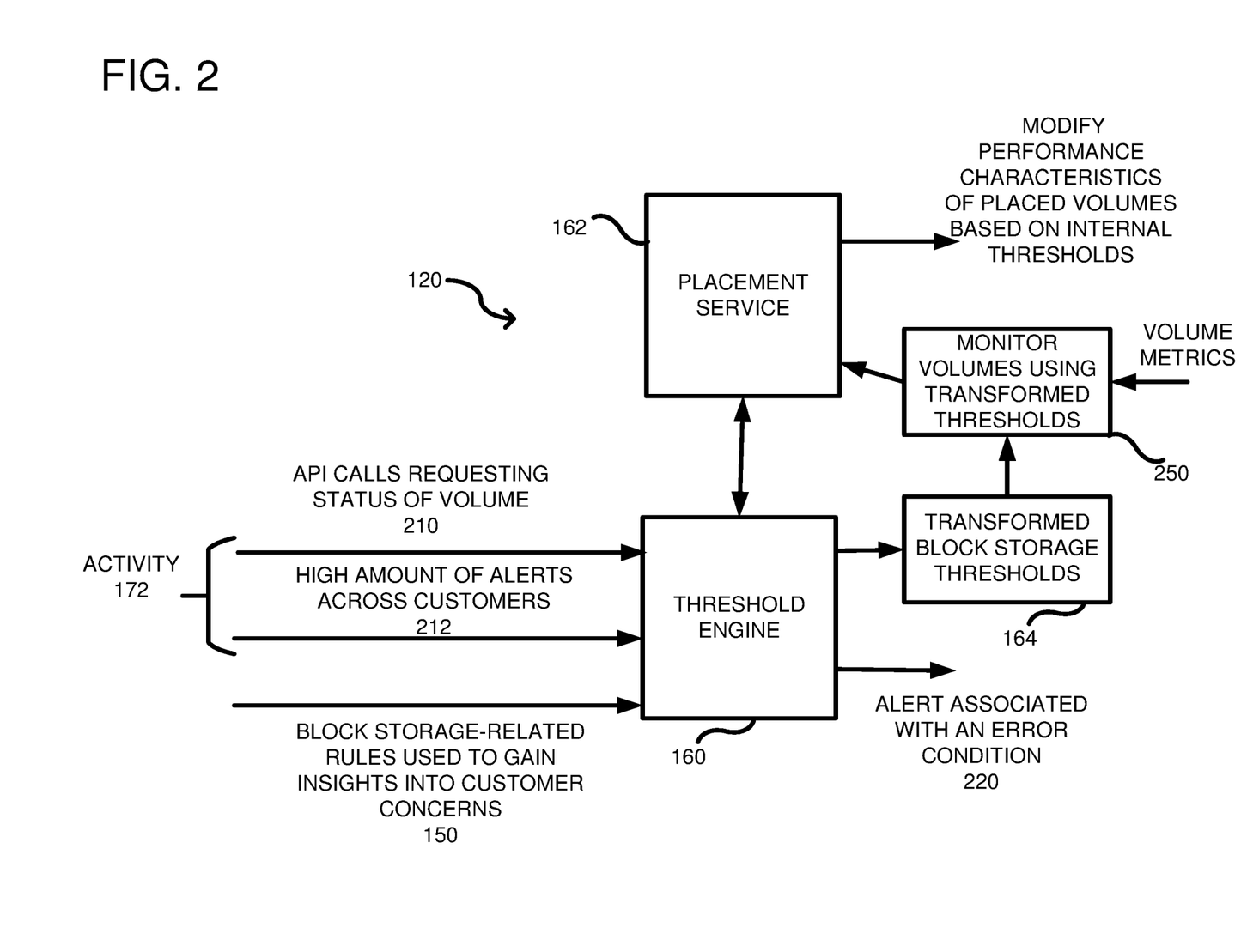
FIG. 2 expands on the system of FIG. 1 showing further details for generating internal thresholds for monitoring volumes and placing or moving volumes in response thereto.

FIG. 2 shows additional details of the block storage service 120. As shown, the activity signals 172 that are passed to the threshold engine 160 can include API calls requesting a status of the volume, shown at 210, and a high amount of alerts occurring across multiple customers, shown at 212. In regard to the API calls, such calls are typically used with services in a compute service environment. A service is a software function provided at a network address over the web or the cloud. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

A threshold level of API calls can be established, based on past history in terms of volumes targeted and frequency of the requests. A percentage increase over a typical amount of API calls requesting status of a volume over a predetermined time period can indicate a problem with such a volume. The threshold engine 160 can take multiple actions depending on the particular implementation. For example, the threshold engine 160 can generate an alert of the error condition, as shown at 220. Such an alert 220 can be sent to a network administrator that can make decisions about how to trouble shoot or correct any defects. Alternatively, the threshold engine 160 can notify the placement service 162 to move the problematic volume to increase resources associated with the volume, such as providing one or more server computers with increased IOPS, reduced latency, or increased throughput. As yet another alternative, the threshold engine can generate a new threshold stored in storage 164, so as to pick up similar problems in the future.

In regard to the high amount of alerts 212, the monitoring service 130 (FIG. 1) can detect that a high number of customer alerts are occurring across volumes for multiple customers. Similar techniques used for determining the high level of API calls 210 can be used. In response, the threshold engine 160 can transmit an alert 220 or communicate with the placement service 162 to take corrective action on the impacted volumes.

At 150, the rules associated with the monitoring service 130 can be received by the block storage service 120. The rules provide insights into customer concerns. For example, if the customer sets a rule that latency exceeding 100 ms is problematic, then the threshold engine 160 can use such a rule to generate the internal thresholds in storage 164. Generally, the storage 164 includes thresholds generated by the threshold engine that transform the rule into a threshold that is different from thresholds generated by the monitoring service 130. In one example, the transformed threshold can be a percentage less than would trigger the thresholds of the monitoring service. Returning to the above example, if the rule indicates 100 ms latency, then the transformed threshold 164 can be 80 ms so as to detect any problems before the customer is alerted and take corrective action, such as through the placement service 162.

The block storage service 120 can further include an internal monitor 250 that uses the internal thresholds in storage 164 and compares the thresholds to volume metrics received from the volumes 140 or other associated service that detects and gathers the volume metrics. The monitor 250 can also be coupled to the placement service 162 so as to instruct the placement service 162 how to place future volumes or move current volumes so at to increase resources for problem volumes. The volume's resources can also be modified without moving the volumes by changing allocations of the server's resources that are provided to a volume. Examples of changing such allocations includes providing more IOPS, increasing throughput, allocating more memory, allocating more storage, allocating more CPU cycles, etc.

Figure 3:
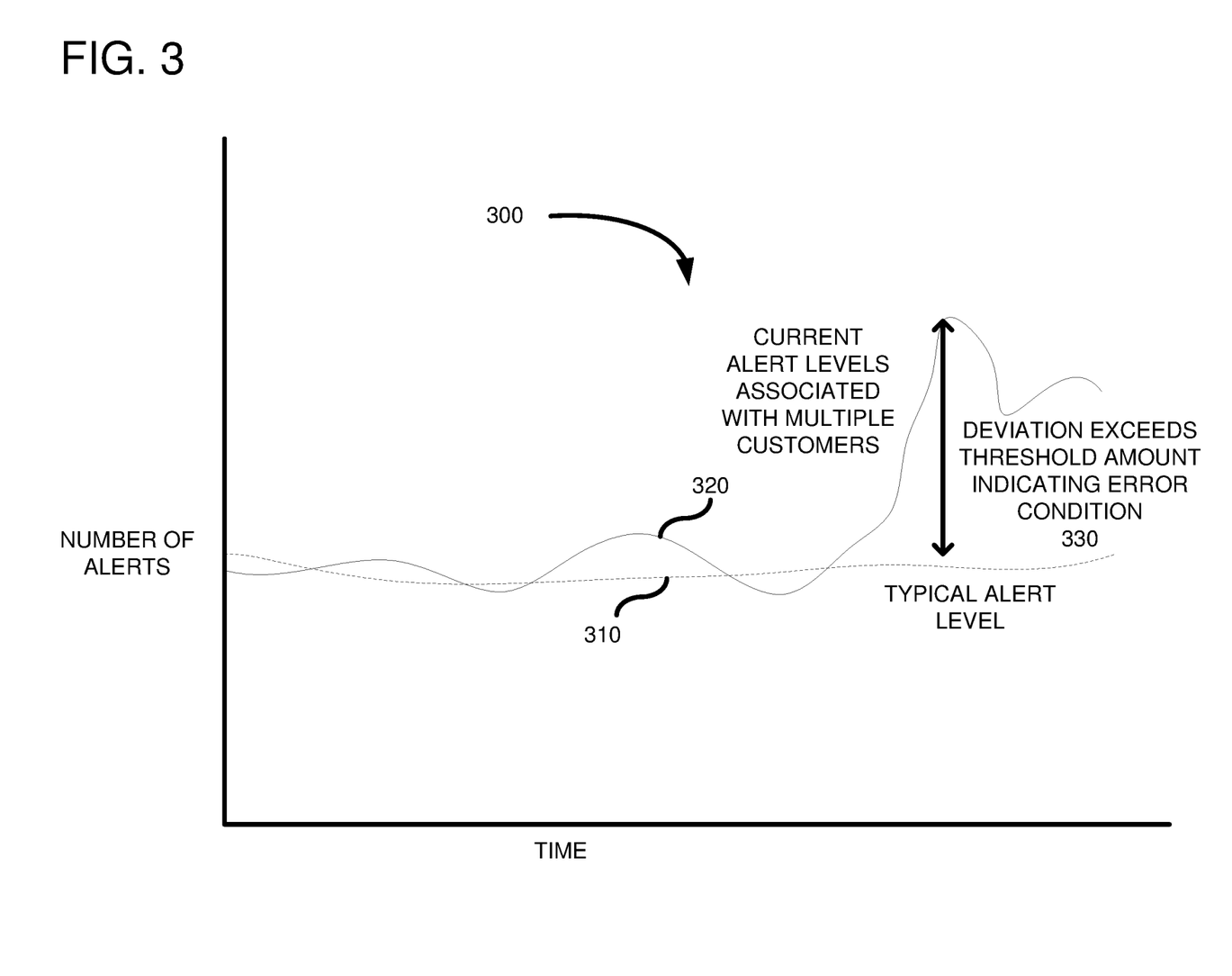
FIG. 3 is a graph indicating an unusual level of customer alerts deviating from a typical level indicating a systemic problem in the block storage service.

FIG. 3 is a graph 300 indicating when the threshold engine 160 can determine that the high amount of alerts across customers 212 has exceeded a threshold level. At 310, a typical alert level is shown relative to past time period. A current level of alerts 320 can be compared against the typical past alert level 310. If a deviation between the two, shown at 330, exceeds a threshold amount, then the alert 220 (FIG. 2) can be triggered. In an alternative embodiment, the typical alert level 310 can be replaced with a predetermined constant and if the current level exceeds the constant, then an alert can be triggered. In any case, a plurality of alerts associated with multiple customers and detected externally to the block storage service can be transmitted to the block storage service so that corrective action can be taken.

Figure 4:
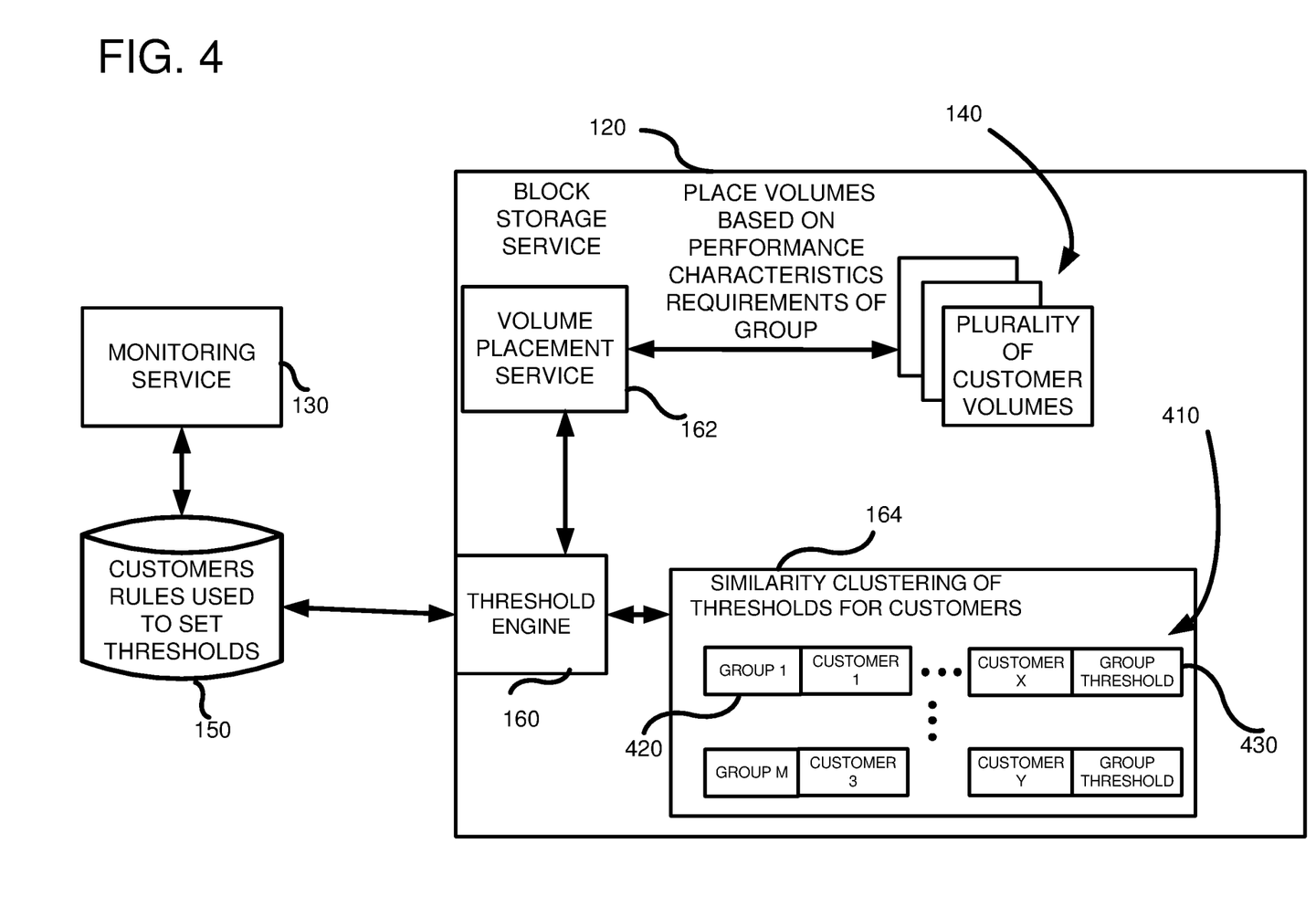
FIG. 4 shows the block storage service forming group thresholds for multiple customers.

FIG. 4 shows another embodiment of the block storage service 120. In this embodiment, the monitoring service 130 and the customer rules 150 are similar to those described in FIG. 1, and will not be re-discussed for purposes of brevity. However, the storage 164 can include a clustering of customer thresholds, shown generally at 410. The clustering of customer thresholds groups customers together based on a threshold type wherein the thresholds are very similar for the customers. Thus, as shown at 420, a first group of customers including X customers (where X is any integer number) are all identified as having a same volume threshold 430. For example, the group threshold 430 can indicate TOPS that are similar for all members in the group. Any number of groups can be defined and violating a group threshold indicates all members of the group violated the threshold. The resultant action of moving volumes can also occur for all members of the group using the volume placement service 162.

Figure 5:
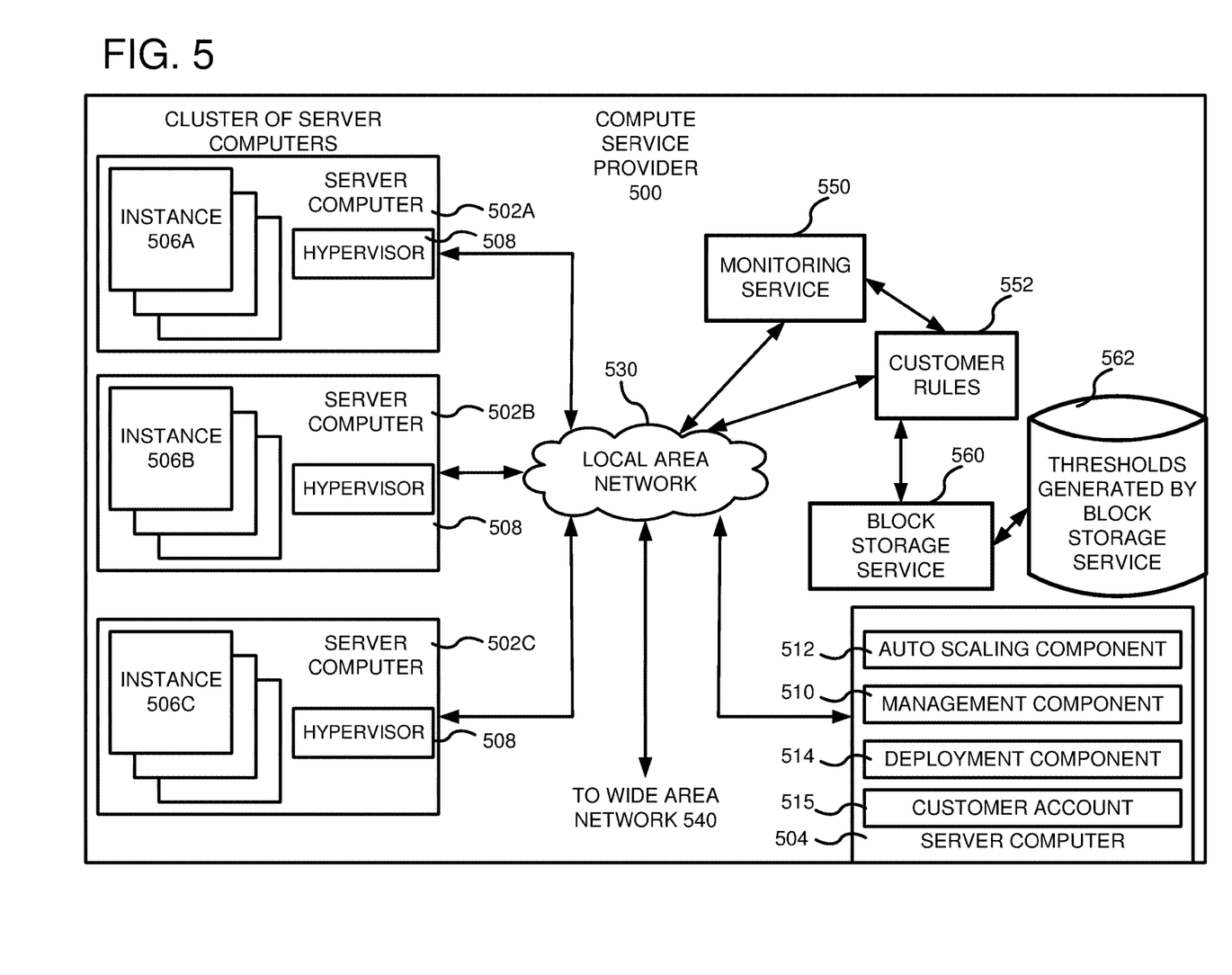
FIG. 5 is an example system diagram showing a plurality of virtual machine instances running in the multi-tenant environment and the block storage service using customer rules associated with a separate monitoring service.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502C. While only three server computers are shown, any number can be used, and large centers can include thousands of server computers. The server computers 502A-502C can provide computing resources for executing software instances 506A-506C. In one embodiment, the instances 506A-506C are virtual machines. As known in the art, a virtual machine is an instance of a software implementation of a machine (i.e. a computer) that executes applications like a physical machine. In the example of virtual machine, each of the servers 502A-502C can be configured to execute a hypervisor 508 or another type of program configured to enable the execution of multiple instances 506 on a single server. Additionally, each of the instances 506 can be configured to execute one or more applications that can attach to volumes as previously described.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG.

5 has been simplified and that many more networks and networking devices can be utilized to interconnect the various computing systems disclosed herein.

A monitoring service 550 is shown coupled to the network 530 and uses customer rules 552 in order to monitor the instances 506, which can execute applications and operating systems for different customers in the compute service provider environment. The customer rules 552 are used to define thresholds that the monitoring service 550 uses to generate alerts. A block storage service 560 also accesses the customer rules, which are designed to be used by the monitoring service 550, to gain external insights into customer behavior and concerns. The block storage service 560 can use the customer rules 552 to generate its own internal thresholds 562.

Figure 6:
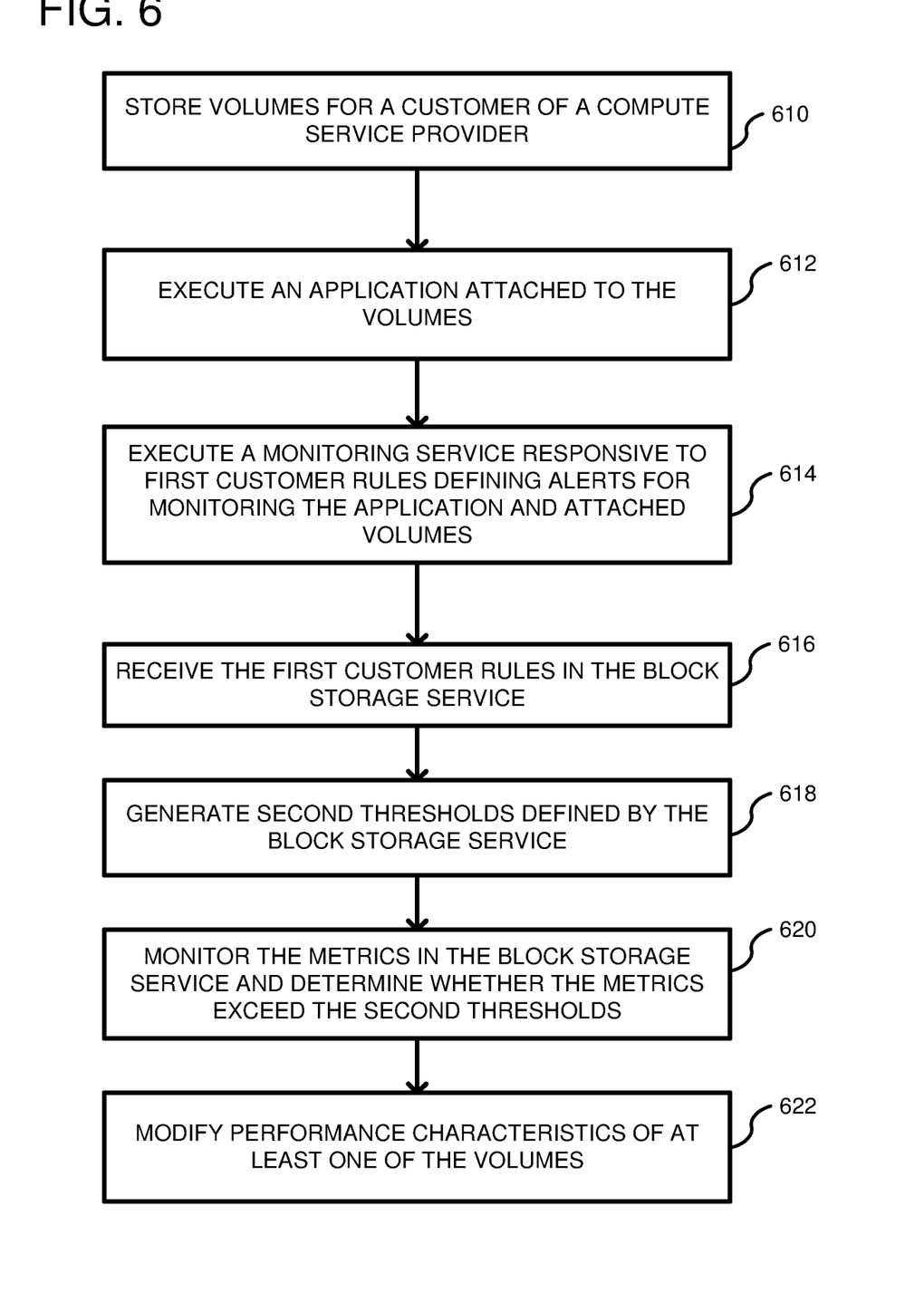
FIG. 6 is a flowchart according to one embodiment for using customer input to determine proper functionality of a block storage service.

FIG. 6 is a flowchart of a method for using customer input to determine proper functionality of a block storage service. In process block 610, volumes are stored for a customer of the compute service provider. For example, in FIG. 1, the volumes are stored at 140. The volumes can be stored on server computers and a single volume can be divided into partitions and stored over a plurality of server computers. In process block 612, an application is executed that is attached to the volumes. Execution of the application can be requested by the customer, but it is the compute service provider that executes the application on a server computer using the underlying hardware and, in some cases, a hypervisor or other management software under the control of the compute service provider. Likewise, it is the compute service provider that executes virtual machines on server computers within the compute service provider environment, wherein the virtual machines are managed by the compute service provider. As shown in FIG. 1, the application 134 is attached to the customer volumes 140. This allows the application to use the volumes as a storage medium. In process block 614, a monitoring service is executed on a server computer under the control of the compute service provider. For example, the monitoring service 130 can be executed on one or more server computers within the compute service provider environment. The monitoring service is responsive to first customer rules (see 150 in FIG. 1) defining alerts for monitoring the application and attached volumes. The rules can define in simple terms for the customers, the desired thresholds. However, the monitoring service can convert the rules into the thresholds in accordance with procedures implemented by the compute service provider. In process block 616, the first customer rules are received by the block storage service, such as in the threshold engine 160 of FIG. 1. Thus, external rules used by a separate service from the block storage service are released to the block storage service. In some embodiments, releasing of the rules can require customer approval. The rules provide insights to customer desired functionality, which can be used to proactively ensure volumes are healthy and executing properly. In process block 618, the block storage service can generate second thresholds using the received rules. The second thresholds are generally different than the thresholds used by the monitoring service and are triggered prior to the triggers for the monitoring service by a sufficient amount that the block storage service can take corrective action. In process block 620, the metrics are monitored in the block storage service and a determination can be made if the metrics exceed the second thresholds. In process block 622, if the thresholds are exceeded, the performance characteristics of the volumes can be modified by the block storage service. Examples of such modifications include, but are not limited to, increasing IOPS, reducing latency, increasing bandwidth capacity, and increasing throughput capacity, through proper selection of resources that store the volumes. In some cases, the thresholds can detect if the customer has too much performance capability. In such a case, the customer volume can be moved to a less costly alternative.

Figure 7:
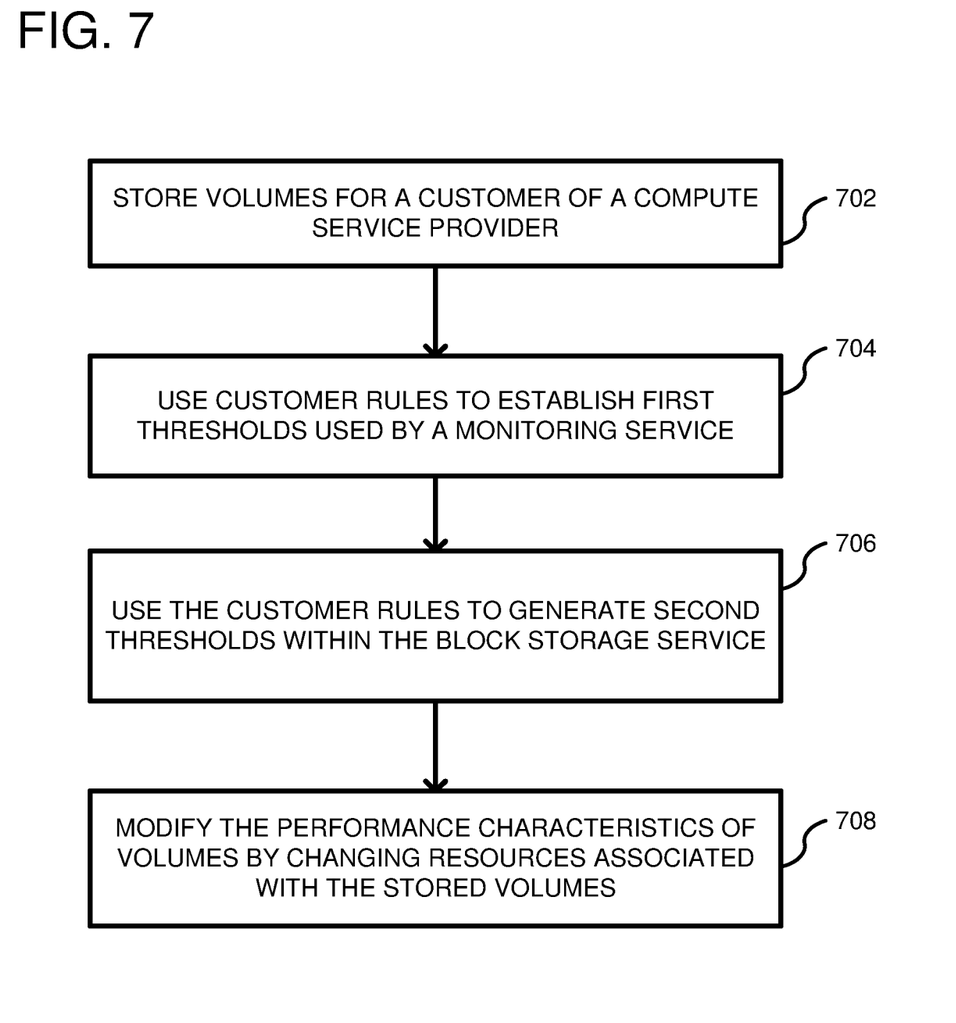
FIG. 7 is a flowchart according to another embodiment for using customer input to determine proper functionality of a block storage service.

FIG. 7 is a flowchart according to another embodiment for using customer input to determine proper functionality of a block storage service. In process block 702, volumes are stored for a customer of the compute service provider. The volumes can be stored on server computers in one example and can be partitioned across server computers, if desired. In process block 704, customer rules are used to establish first thresholds used by a monitoring service, which is a service of a multi-tenant environment. In process block 706, the same customer rules can be used by a block storage service to generate second thresholds, different than the first thresholds. In process block 708, the performance characteristics of the volumes can be modified by changing resources associated with the stored volumes.

Figure 8:
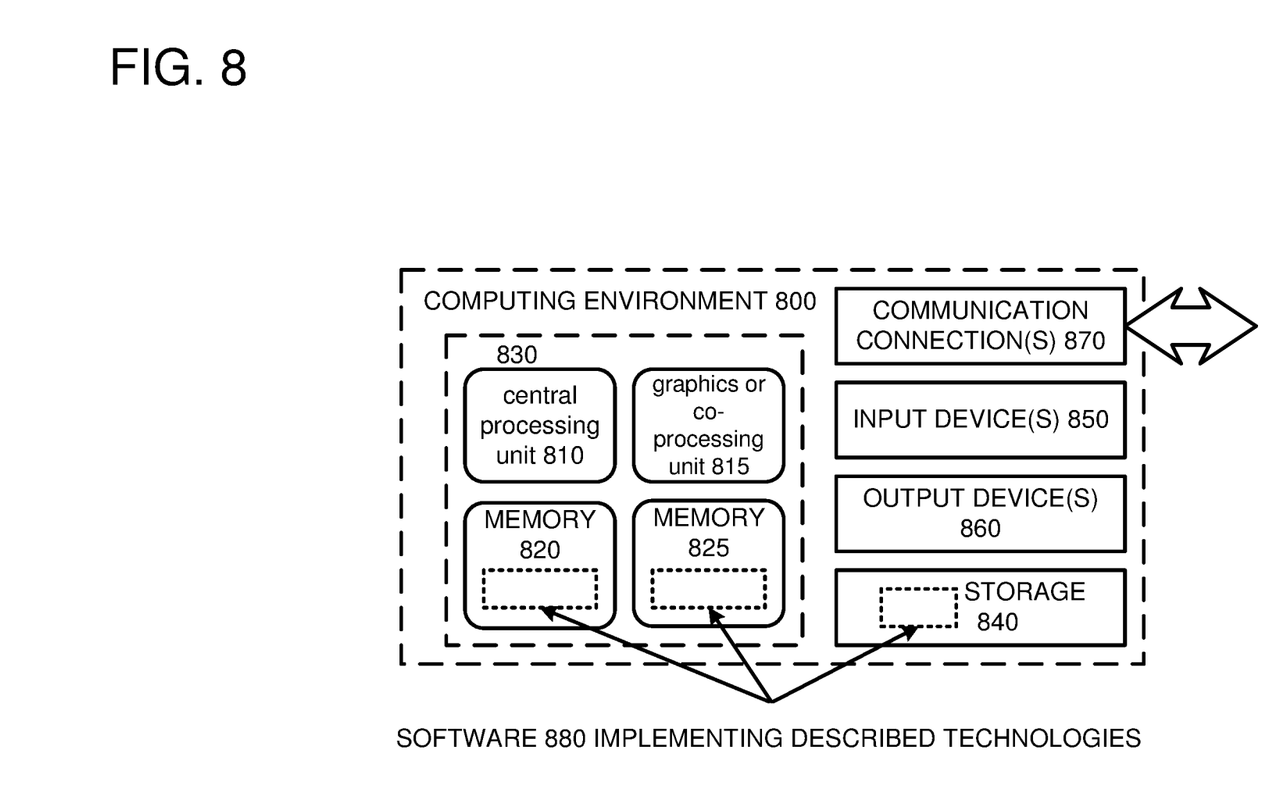
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method comprising:
   in a block storage service, storing volumes of storage for a customer of a compute service provider;
   in a first server computer within the compute service provider, executing a virtual machine attached to a volume of the stored volumes of storage, wherein the virtual machine includes an application;
   in one or more other server computers within the compute service provider, executing a monitoring service responsive to first customer rules defining alerts established by the customer for monitoring the application and the attached volume;
   in the block storage service, receiving the first customer rules defining the alerts, which are triggered by the monitoring service in response to metrics of the volume exceeding a first threshold;
   generating a second threshold using the customer rules and the first threshold, the second threshold being generated by the block storage service by transforming at least one of the customer rules into the second threshold including deriving the second threshold from the first threshold for maintaining the volume at a desired performance level, wherein the second threshold is selected to be triggered prior to the first threshold to avoid the customer receiving alerts that the first threshold was exceeded;
   monitoring the metrics in the block storage service and determining whether the metrics exceed the second threshold;
   monitoring a frequency of requests related to the attached volume; and in response to the metrics exceeding the second threshold and the frequency of requests exceeding a threshold deviation from a baseline frequency of requests, moving the volume.

2. The method of claim 1, further comprising receiving the alerts from the monitoring service for the customer and other customers of the compute service provider, comparing the alerts to a typical alert level and determining that the block storage service has an error condition if a deviation between the alerts and the typical alert level exceeds a threshold amount.

3. The method of claim 1, wherein the modifying of the performance characteristics includes moving one or more of the volumes of the customer to increase resources for any one or more of latency, input/output operations per second (IOPS) or throughput.

4. The method of claim 1, wherein the moving of the volume includes using a less costly resource to store the volume.

5. The method of claim 1, wherein the block storage service proactively modifies the performance characteristics of the plurality of volumes based on the second threshold before the first threshold is exceeded.

6. A computer-readable storage medium comprising instructions that upon execution by one or more processors cause a computer system to:
store volumes associated with a customer in a block storage service of a multi-tenant environment;
in a monitoring service within the multi-tenant environment, use customer rules provided by the customer to establish a first threshold to monitor the stored volumes;
use the customer rules to generate a second threshold within the block storage service, the second threshold being different than the first threshold and wherein the second threshold is generated by the block storage service by transforming the customer rules and the first threshold into the second threshold, which is derived from the first threshold to ensure that the second threshold is triggered prior to the first threshold;
monitor a frequency of requests related to the stored volumes over a predetermined period of time to establish a typical frequency of requests; and
by the block storage service, modify performance characteristics of the stored volumes by changing resources associated with the stored volumes in response to metrics of the stored volumes exceeding the second threshold and the frequency of the requests exceeding the typical frequency of requests by a threshold amount, wherein the modification of the performance characteristics includes physically re-locating at least one of the stored volumes.

7. The computer-readable storage medium of claim 6, wherein the performance characteristics are associated with at least one of input/output operations per second (IOPS) capacity, a latency capacity, a bandwidth capacity, a throughput capacity or a volume storage capacity.

8. The computer-readable storage medium of claim 6, wherein the second threshold is chosen to be exceeded by the metrics prior to the first threshold being exceeded so as to proactively modify the performance characteristics of the stored volumes before the first threshold is exceeded.

9. The computer-readable storage medium of claim 6, further including instructions that upon execution cause the computer system to:
monitor an amount of alerts across multiple customers of the multi-tenant environment using the monitoring service; and
transmit an alert if the amount exceeds a threshold.

10. The computer-readable storage medium of claim 6, further including instructions that upon execution cause the computer system to:
monitor customer application programming interface (API) volume status requests and increase the resources in response to the API volume status requests.

11. The computer-readable storage medium of claim 6, further including instructions that upon execution cause the computer system to:
execute virtual machines within the multi-tenant environment, the virtual machines being attached to the stored volumes.

12. The computer-readable storage medium of claim 11, further including instructions that upon execution cause the computer system to:
monitor the virtual machines using the monitoring service.

13. The computer-readable storage medium of claim 6, wherein the modification of the performance characteristics includes instructing a placement service that future volumes placed for the customer on server computers should meet the modified performance characteristics.

14. The computer-readable storage medium of claim 6, further including instructions that upon execution cause the computer system to:
group together multiple customers using a single group threshold, which includes the second threshold .

15. A system for allocating resources to a customer volume in a service provider, comprising:
a first server computer configured to store a customer volume in a block storage environment;
a second server computer configured to host a virtual machine attached to the customer volume;
a third plurality of server computers configured to execute a monitoring service coupled to receive first metrics from the first server computer and to receive second metrics from the second server computer;
a database readable by the third plurality of server computers including a set of customer rules provided by the customer and used by the monitoring service to generate customer thresholds to trigger alerts in response to the first and second metrics; and
a threshold engine within the block storage environment configured to generate internal thresholds that are derived from the customer thresholds and that are selected so that the internal thresholds are exceeded prior to the alerts being triggered, wherein the threshold engine establishes a typical frequency of calls related to the customer volume based upon past history and establishes a threshold deviation from the typical frequency;
wherein the block storage environment modifies a performance characteristic of the stored customer volume by changing a resource associated with the stored volume in response to a customer use metric exceeding the internal threshold and the threshold deviation from the typical frequency of calls being exceeded.

16. The system of claim 15, further including a placement service coupled to the threshold engine for moving the customer volume to modify the performance characteristics.

17. The system of claim 15, wherein the modifying of the performance characteristics includes increasing resources for any one or more of latency, input/output operations per second (IOPS), bandwidth or throughput.

18. The system of claim 15, wherein the threshold generator generates a group threshold associated with the customer and other customers of the service provider block storage environment.

19. The system of claim 15, wherein the block storage environment proactively modifies the performance characteristics of the stored customer volume before the customer rules are violated.

* * * * *